(12) United States Patent
Dalton et al.

(10) Patent No.: US 7,421,556 B2
(45) Date of Patent: Sep. 2, 2008

(54) METHOD AND APPARATUS FOR MIGRATING DATA BETWEEN HETEROGENEOUS DATA STORAGE DEVICES

(75) Inventors: Gregory Dalton, Southampton (GB); Geoff Lane, Southampton (GB); Stephen P. Legg, Southampton (GB); Robert B. Nicholson, Southsea (GB); William J. Scales, Fareham (GB); Barry D. Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/392,328

(22) Filed: Mar. 29, 2006

(65) Prior Publication Data
US 2007/0016745 A1 Jan. 18, 2007

(30) Foreign Application Priority Data
Jul. 14, 2005 (GB) .................. 0514541.2

(51) Int. Cl.
*G06F 13/00* (2006.01)

(52) U.S. Cl. ...................................................... 711/165
(58) Field of Classification Search ...................... None
See application file for complete search history.

(56) References Cited

U.S. PATENT DOCUMENTS

| 6,260,124 B1* | 7/2001 | Crockett et al. ............. 711/162 |
| 2002/0083120 A1* | 6/2002 | Soltis ......................... 709/200 |
| 2004/0123063 A1* | 6/2004 | Dalal et al. .................. 711/170 |

* cited by examiner

*Primary Examiner*—Reginald G. Bragdon
*Assistant Examiner*—Larry T Mackall
(74) *Attorney, Agent, or Firm*—Dillon & Yudell LLP

(57) ABSTRACT

A method for migrating data between heterogeneous data storage devices within a storage area network is disclosed. A first virtualizer presents stored data as a first virtual disk, and then communicates a managed disk representation of the first virtual disk to a second virtualizer. After receiving the managed disk representation, the second virtualizer virtualizes the stored data from the managed disk representation as a second virtual disk. At such point, the stored data can be progressively migrated from the first virtualizer to the second virtualizer.

4 Claims, 4 Drawing Sheets

METHOD AND APPARATUS FOR MIGRATING DATA BETWEEN HETEROGENEOUS DATA STORAGE DEVICES

RELATED PATENT APPLICATION

The present patent application claims priority to an European Application No. 0514541.2, filed on Jul. 14, 2005.

BACKGROUND OF THE INVENTION

1. Technical Field

The present invention relates to data storage in general, and in particular to migrating data between data storage devices. Still more particularly, the present invention relates to a method and apparatus for migrating data between heterogeneous data storage devices within a Storage Area Network.

2. Description of Related Art

In order to provide storage virtualization, Storage Area Network (SAN) switches and SAN appliances typically abstract a server from a storage device by adding a new layer that manipulates input/output (I/O) requests. The new layer requires metadata that describes the placement of data and metadata that maps between virtual and physical addresses. Currently, there is no industry standard for describing such metadata. As a result, each vendor's devices are incompatible with each other from a co-operative perspective.

As more and more vendors are producing virtualization devices, customers are likely to switch vendors from time to time. The change of vendors requires some form of migration procedure to translate the metadata of a first vendor's device into the metadata of a second vendor's device. The migration typically involves a re-creation of the metadata on a separate device by importing all the data and re-creating the volumes previously exported by the first vendor's device. The simplest method is to perform a tape-based backup of the data, and the subsequent restore can then be made to the new volumes exported by the second vendor's device. The entire procedure requires quiescing and flushing of all existing servers and applications using the separate device.

Conventional techniques of migrating data have at least two disadvantages. First, there is a long period of downtime for the data to be backed up and restored. The downtime may be hours or even days, depending on the amount of data being migrated. Second, twice the normal capacity of storage is typically needed. This is because, for maximum reliability, the original storage device should remain available if anything goes wrong during the backup/restore process. Thus, an extra set of storage arrays and controllers is required for the restored data.

Consequently, it would be desirable to provide an improved method and apparatus for migrating data between storage devices.

SUMMARY OF THE INVENTION

In accordance with a preferred embodiment of the present invention, a first virtualizer presents stored data as a first virtual disk, and then communicates a managed disk representation of the first virtual disk to a second virtualizer. After receiving the managed disk representation, the second virtualizer virtualizes the stored data from the managed disk representation as a second virtual disk. At such point, the stored data can be progressively migrated from the first virtualizer to the second virtualizer.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention provides a method and apparatus for migrating data between storage devices while maintaining access to the data by a server and applications. A preferred embodiment of the present invention involves presenting a first vendor's virtual disk (the disks that are "seen" and used by the server) to a second vendor's virtualization appliance as an usable storage device, and it is called a managed disk. The storage is managed in a special way that allows a one-to-one mapping to be created between the managed disk and a new virtual disk, thus allowing the second vendor's virtualization appliance to present the new virtual disk to the server while the data is being migrated.

The one-to-one mapping of a managed disk to a virtual disk may be implemented by deploying, for example, the image mode function provided by the TotalStorage® SAN volume controller manufactured by the International Business Machines Corporation. The image mode function provides a direct block-for-block translation, from a managed disk to a virtual disk virtualization. The image mode function allows virtualization of managed disks that already contain data.

Figure 1:
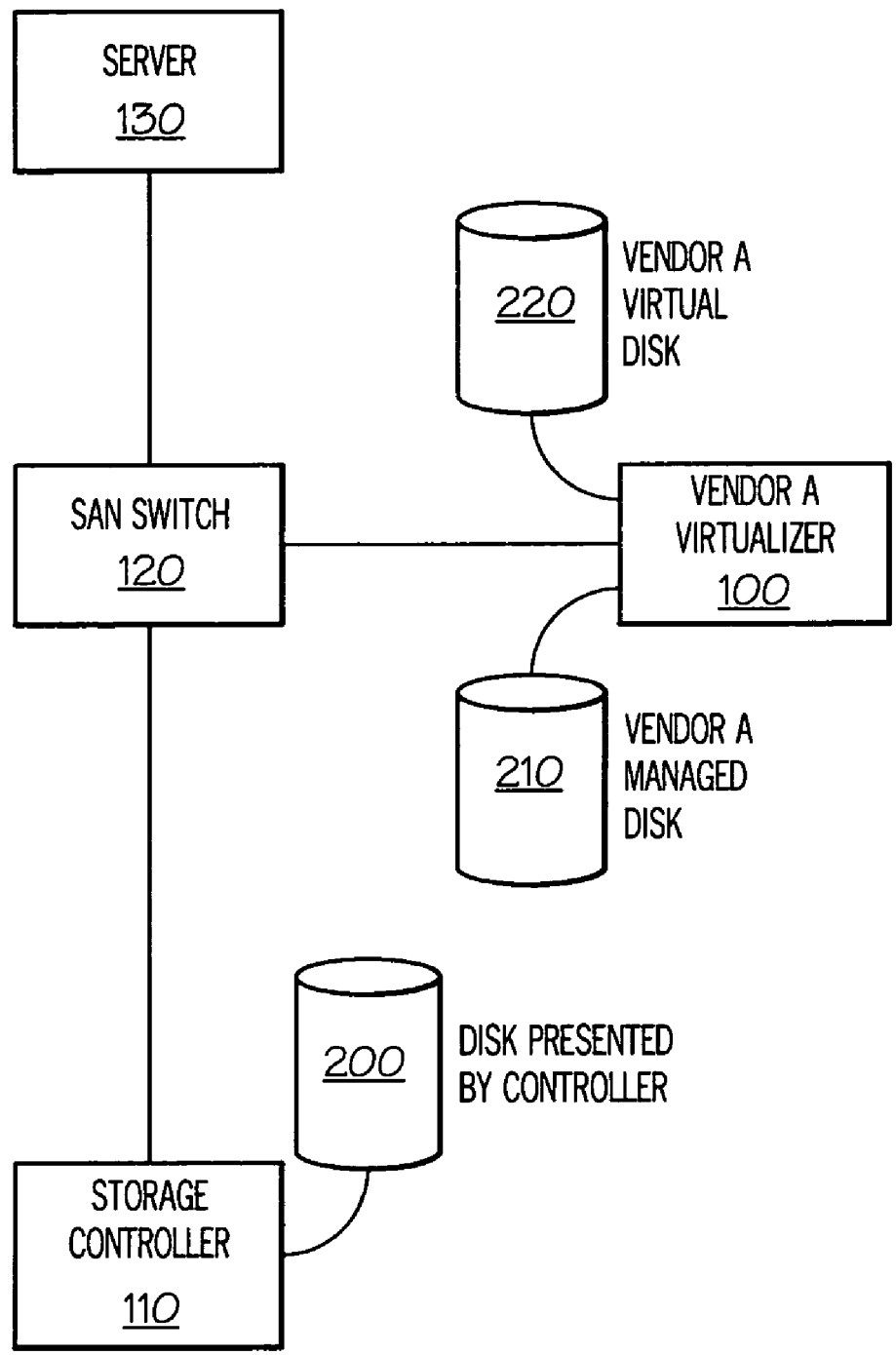
FIG. 1 is a block diagram of an apparatus for migrating data between storage devices, according to the prior art.

Referring now to the drawings and in particular to FIG. 1, there is depicted a block diagram of an apparatus for migrating data between storage devices, according to the prior art. As shown, a storage controller 110 presents a disk 200 to a Storage Area Network (SAN) such as a RAID array. A Vendor A's virtualizer 100 is coupled to storage controller 110 and a server 130 via a SAN switch 120. The SAN is zoned in such a way that only Vendor A's virtualizer 100 can "see" disk 200. Specifically, Vendor A's virtualizer 100 "sees" disk 200 as a managed disk 210. Multiple managed disks can be presented, and Vendor A's virtualizer 100 builds a virtual disk 220 from capacity available in managed disk 210. Virtual disk 220 is presented to server 130 and can be used to perform input/output (I/O) functions.

FIG. 1 depicts a fairly typical configuration in which storage virtualization appliances are used. Basically, Vendor A's virtualizer 100 is the only device that is aware of how virtual disk 220 maps to a physical storage device, such as disk 200, in terms of chunks of managed disk 210. Such information is typically held in proprietary metadata within Vendor A's virtualizer 100.

When a customer decides to move over to a Vendor B's virtualizer, the customer is required to perform a backup at virtual disk 220 level in order to migrate from Vendor A's virtualizer 100 to vendor B's virtualizer so that complete disk images can be saved. If the customer simply removes Vendor A's virtualizer 100 and tries to directly map disk 200 presented by storage controller 100, the data seen at server 130 level will be completely unusable because the vital mapping between virtual and physical disks has been lost.

Figure 2:
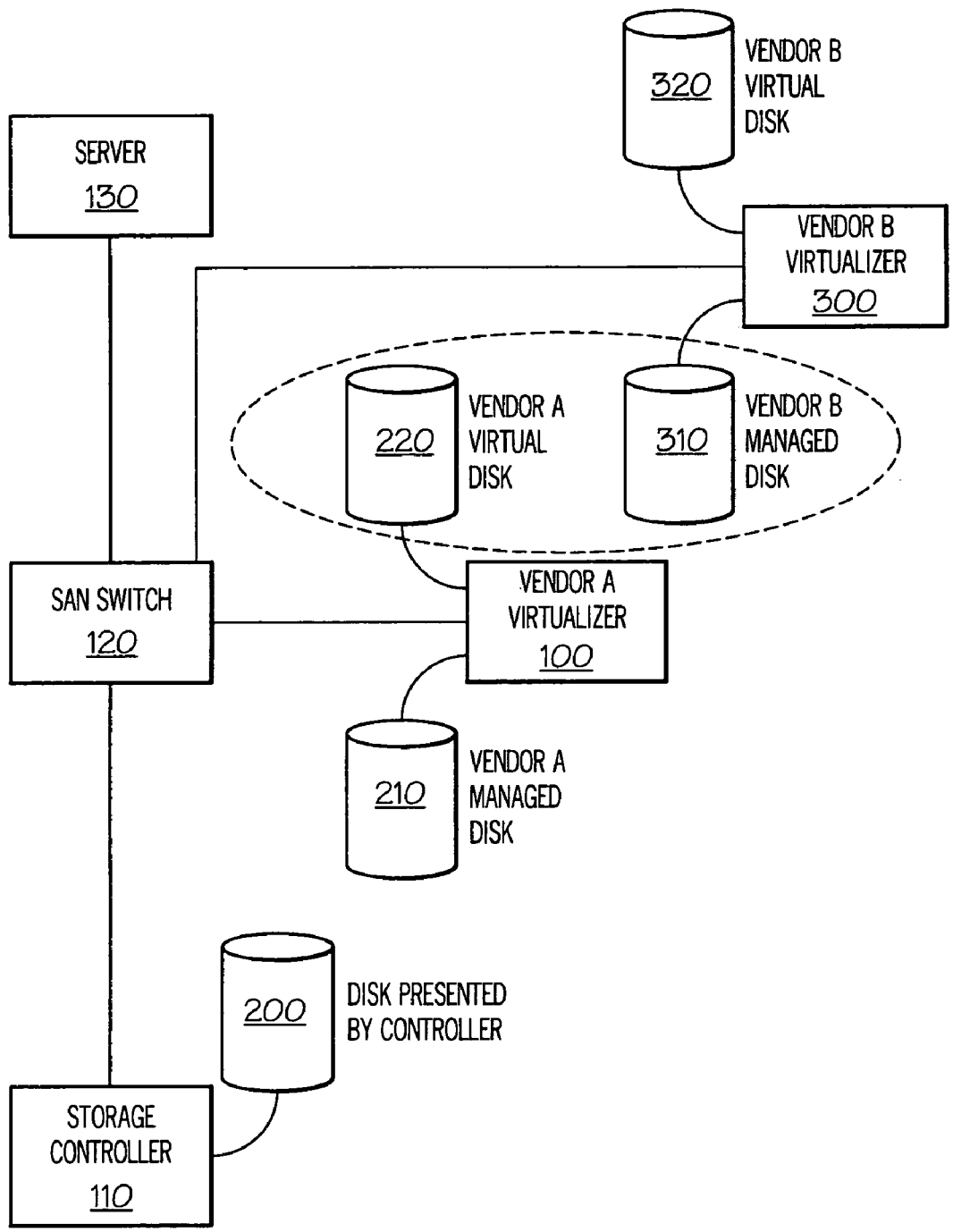
FIG. 2 is a block diagram of an apparatus for migrating data between storage devices, in accordance with a preferred embodiment of the present invention.

With reference now to FIG. 2, there is depicted a block diagram of an apparatus for migrating data between storage devices, in accordance with a preferred embodiment of the present invention. As shown, a Vendor B's virtualizer 300 is added to the configuration of FIG. 1. Vendor B's virtualizer 300 is coupled to storage controller 110 and server 130 via SAN switch 120. Vendor B's virtualizer 300 should be able to support the image mode function (or its equivalent) that allows the one-to-one mapping described above. The configuration of Vendor A's virtualizer 100 and storage controller 110 remain the same. However, instead of presenting virtual disk 220 directly to server 130, Vendor A's virtualizer 100 presents virtual disk 220 to Vendor B's virtualizer 300. In the present configuration, Vendor A's virtualizer 100 is acting as a storage controller to Vendor B's virtualizer 300, and Vendor B's virtualizer 300 is acting as a server to Vendor A's virtualizer 100. As a result, Vendor B's virtualizer 300 "sees" Vendor A's virtual disk 220 as if it were its own managed disk 310. In other words, objects 220 and 310 are in reality the same.

Within Vendor B's virtualizer 300, Vendor B's managed disk 310 (which is Vendor A's virtual disk) is mapped using a one-to-one mapping to create Vendor B's virtual disk 320 that can then be presented to server 130 that "sees" the data arranged as server 130 used to see (i.e., Vendor A's virtual disk 220). Once the above-mentioned mapping has been made, I/O operations can be started from server 130. An I/O request flows through Vendor B's virtualizer 300, which translates the original I/O request to an I/O request to Vendor A's virtual disk 220, acting as Vendor B's managed disk 310. The I/O request to Vendor A's virtual disk 220 then flows through Vendor A's virtualizer 100 as normal, and finally flows down to storage controller 110.

For example, a READ request addressing virtual disk 320 passes from server 130 to Vendor B's virtualizer 300, where the READ request is satisfied by resolving the virtualization metadata to address Vendor B's managed disk 310. Vendor B's managed disk 310 is in reality Vendor A's virtual disk 220, the virtualization metadata of which is resolved by Vendor A's virtualizer 100 into references back to Vendor A's managed disk 210, which in turn represents data stored on disk 200, as presented by storage controller 110.

Now that Vendor B's virtualizer 300 has access to the data and has a path to the placement of the data, the migration process between Vendor A's virtualizer 100 and Vendor B's virtualizer 300 can begin. Meanwhile, server 130 still can continue its access to the data within the storage devices. A new empty set of managed disks can be provided by storage controller 110 to Vendor B's virtualizer 300. The data corresponding to the virtual disks can then be migrated from Vendor B's managed disk 310 (i.e., Vendor A's virtual disk 220) to the new empty set of managed disks. When the migration has been completed, and managed disks 210, 310 are no longer required to provide any data to server 130, managed disks 210, 310 can be unmapped from Vendor A's virtualizer 100 and Vendor B's virtualizer 300, respectively, to be returned to the free pool of managed disks at storage controller 100. The free pool of managed disks may then be used to create more empty managed disks that are available for any subsequent migration.

Figure 3:
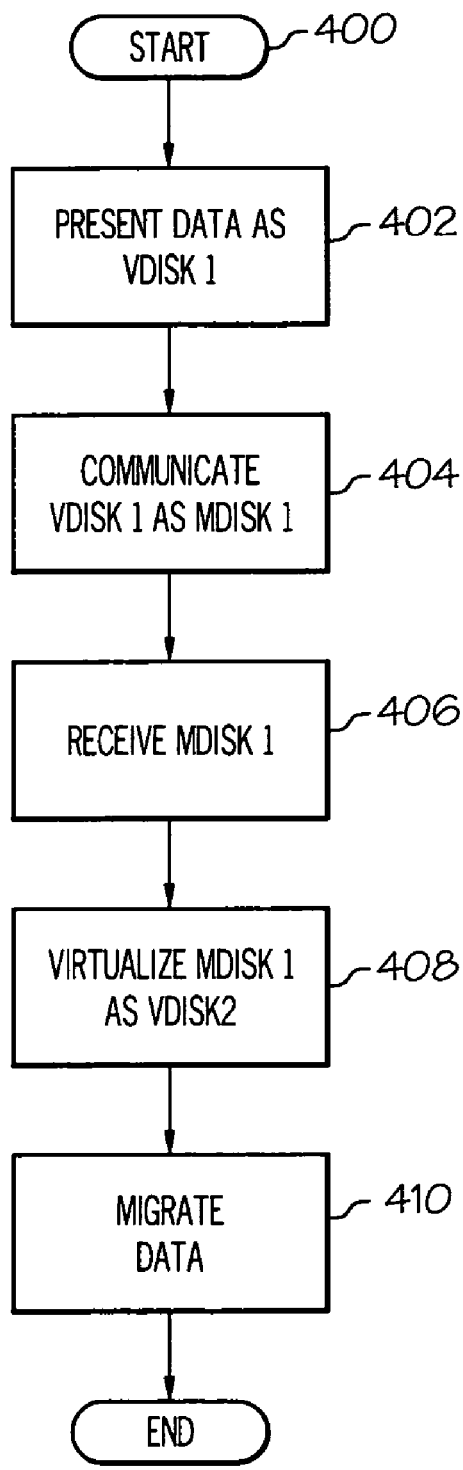
FIG. 3 is a high-level logic flow diagram of a method for migrating data between storage devices, in accordance with a preferred embodiment of the present invention.

Referring now to FIG. 3, there is illustrated a high-level logic flow diagram of a method for migrating data between storage devices while maintaining data access, in accordance with a preferred embodiment of the present invention. Starting in block 400, a first virtualizer presents the stored data as a first virtual disk, as shown in block 402. A communication component communicates a managed disk representation of the first virtual disk, as depicted in block 404, which is received by a receiving component at a second virtualizer, as shown in block 406. The second virtualizer's presentation component virtualizes the stored data from the managed disk representation as a second virtual disk, as depicted in block 408. At this point, data migration between the first and second virtualizers can then be performed in the background, as shown in block 410.

Figure 4:
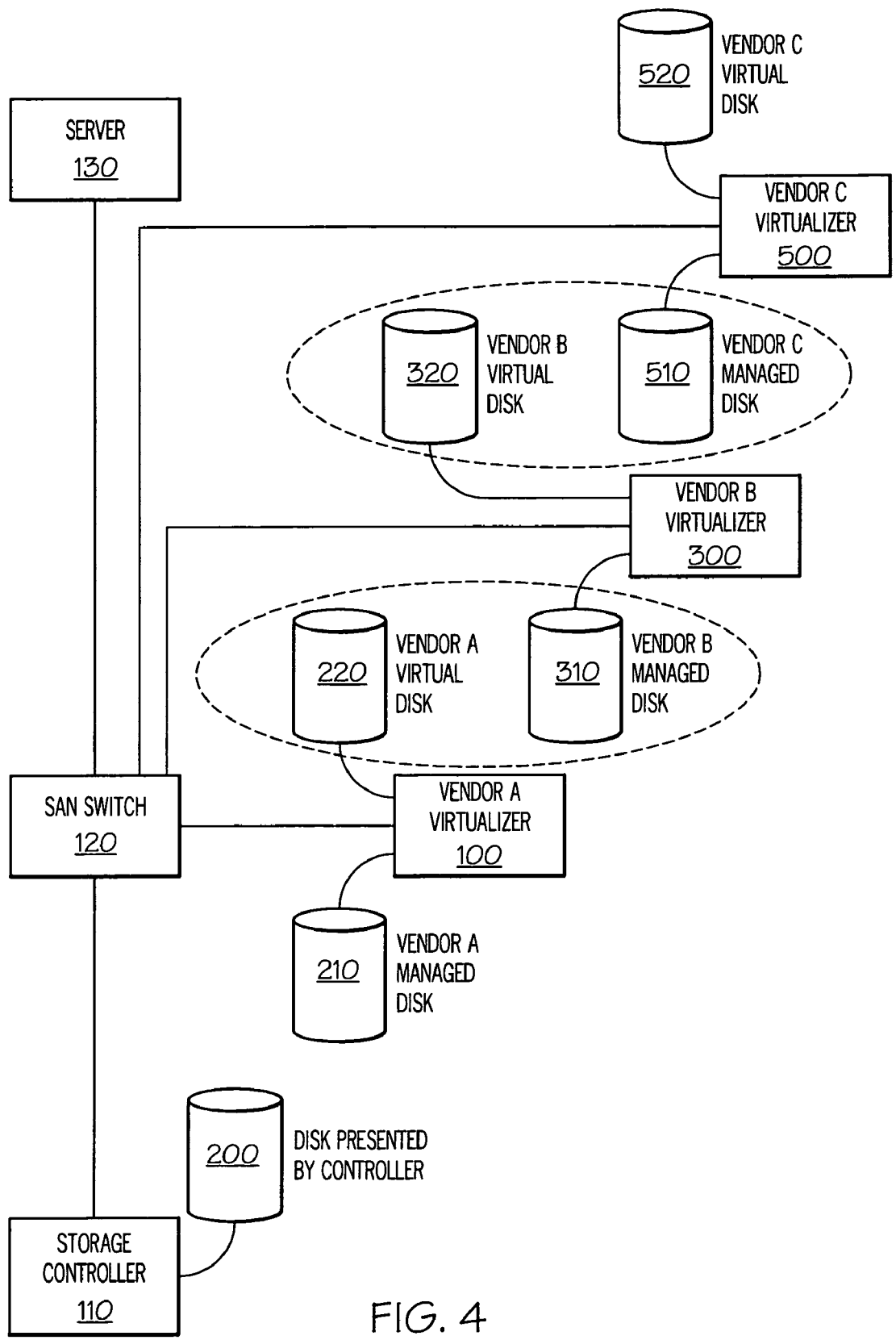
FIG. 4 is a block diagram of an apparatus for migrating data between storage devices, in accordance with an alternative embodiment of the present invention.

With reference now to FIG. 4, there is depicted a block diagram of an apparatus for migrating data between storage devices, in accordance with an alternative embodiment of the present invention. As shown, there are three vendors' virtualizers. within the SAN. This is done, for example, to consolidate multiple disparate virtualized environments under a single vendor's virtualizer. In FIG. 4, a Vendor C's virtualizer 500 is shown with its managed disk 510 and virtual disk 520. Vendor C's virtualizer 500 is coupled to storage controller 110 and server 130 via SAN switch 120. Vendor C's virtualizer 500 and its disks 510, 520 lie in relation to the structure of Vendor B's virtualizer 300 as Vendor B's virtualizer 300 and its disks 310, 320 lie in relation to the structure of Vendor A's virtualizer 100. In the embodiment of FIG. 4, data held in multiple heterogeneous storage virtualization systems can be progressively migrated while accesses to the data by server 130 is retained.

As has been described, the present invention provides an improved method and apparatus for migrating data between storage devices while retaining data access capability. Although the method of the present invention still requires quiescing and flushing of all existing applications using the storage devices, the method of the present invention eliminates some of the disadvantages in the prior art data migration methods. For example, after the original virtual disk has been mapped into a new vendor's appliance, it can be accessed by a server. Thus, the downtime of migration is minimized to the time it takes a user to create the mapping (typically in a matter of minutes). In addition, only a small amount of free capacity is required in a disk. In the best case, this will be the same amount of capacity as the largest of the old virtual disks.

It is also important to note that although the present invention has been described in the context of a fully functional storage system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for migrating data between storage devices manufactured by different vendors while maintaining data access to one of said storage devices, said method comprising:
 allowing a first virtualizer associated with a storage network to access a disk as said first virtualizer's managed disk, wherein said disk is controlled by a storage controller and said disk was previously presented by said storage controller to a server within said storage network;
 constructing a first virtual disk of said first virtualizer by said first virtualizer based on capacity available in said first virtualizer's managed disk;
 presenting said first virtual disk by said first virtualizer to a second virtualizer associated with said storage network to allow said second virtualizer to access said first virtual disk as said second virtualizer's managed disk;
 constructing a second virtual disk of said second virtualizer by said second virtualizer via a one-to-one mapping of said second virtualizer's managed disk;
 progressively migrating stored data from said first virtualizer to said second virtualizer; and
 unmapping said managed disks from said first and second virtualizers after said data migration has been completed.

2. The method of claim 1, wherein said method further includes allowing said first virtualizer to act as a storage controller to said second virtualizer, and allowing said second virtualizer to act as a server to said first virtualizer.

3. The method of claim 1, wherein said method further includes coupling said first virtualizer and said second virtualizer to said storage controller and said server via a network switch.

4. The method of claim 1, wherein said first virtualizer is manufactured by a first vendor and said second virtualizer is manufactured by a second vendor having a different specification from that of said first vendor.

* * * * *